United States Patent
Jüstel et al.

(10) Patent No.: US 6,398,970 B1
(45) Date of Patent: Jun. 4, 2002

(54) DEVICE FOR DISINFECTING WATER COMPRISING A UV-C GAS DISCHARGE LAMP

(75) Inventors: Thomas Jüstel; Hans Nikol; Jürgen Dirscherl, all of Aachen; Detlef U. Wiechert, Alsdorf, all of (DE)

(73) Assignee: U.S. Philips Corporation, New York, NY (US)

( * ) Notice: Subject to any disclaimer, the term of this patent is extended or adjusted under 35 U.S.C. 154(b) by 0 days.

(21) Appl. No.: 09/561,613

(22) Filed: Apr. 27, 2000

(30) Foreign Application Priority Data

Apr. 28, 1999 (DE) .......................... 199 19 169

(51) Int. Cl.[7] .............. C02F 1/32; H01J 61/42
(52) U.S. Cl. ............... 210/748; 422/186.3; 313/486; 313/607; 313/635; 313/643
(58) Field of Search ............... 210/748, 512; 422/24, 186.3; 252/301.4; 313/486, 487, 568, 572, 581, 637, 643, 607, 635; 250/432 R, 461.1

(56) References Cited

U.S. PATENT DOCUMENTS

| | | | | |
|---|---|---|---|---|
| 2,272,992 A | * | 2/1942 | Hebo | |
| 2,445,692 A | * | 7/1948 | Porter et al. | |
| 3,715,612 A | * | 2/1973 | Someya et al. | |
| 3,909,657 A | * | 9/1975 | Brown | |
| 4,070,598 A | * | 1/1978 | DeLuca et al. | |
| 4,216,408 A | * | 8/1980 | Verstegen et al. | |
| 4,859,903 A | * | 8/1989 | Minematu et al. | |
| 4,983,881 A | | 1/1991 | Eliasson et al. | ............ 313/607 |
| 5,380,503 A | * | 1/1995 | Fujii et al. | |
| 5,821,685 A | * | 10/1998 | Peterson | |
| 6,193,894 B1 | * | 2/2001 | Hollander | |

FOREIGN PATENT DOCUMENTS

EP 0312732 B1 4/1989

* cited by examiner

*Primary Examiner*—David A. Simmons
*Assistant Examiner*—Fred Prince
(74) *Attorney, Agent, or Firm*—Ernestine C. Bartlett

(57) ABSTRACT

The device for disinfecting water comprises a gas discharge lamp including a discharge vessel with walls composed of a dielectric material, which walls are provided on their outer surfaces with at least a first and a second electrode, and which discharge vessel contains a gas filling containing xenon, the inner surface of the walls being at least partly covered with a coating containing a phosphor emitting in the UV-C range. Such a device for disinfecting water can always be made 100% operation within milliseconds, and the UV-radiation of the device has a spectral composition which lies exclusively in the range relevant for disinfecting, i.e. between 230 and 300 nm.

8 Claims, 5 Drawing Sheets

DEVICE FOR DISINFECTING WATER COMPRISING A UV-C GAS DISCHARGE LAMP

BACKGROUND OF THE INVENTION

The invention relates to a device for disinfecting water, comprising a gas discharge lamp including a discharge vessel with walls composed of a dielectric material, the outer surface of said walls being provided with at least a first and a second electrode, and the discharge vessel containing a xenon-containing gas filling.

By means of disinfection, pathogenic organisms such as bacteria, viruses, fungi and protozoa are rendered harmless. Both chemical and physical disinfection processes have been known for a long period of time. For the disinfection of water use is also made of chemical and physical processes. The chemical processes are largely based on the use of chlorine compounds and ozone. Physical processes, such as filtration, ultrasound, heating or irradiating with UV-light constitute a smaller burden for the ambient air. In addition, exposure of water to UV-radiation is a continuous and maintenance-free process.

It is known to use low-pressure or high-pressure mercury discharge lamps to disinfect water by means of UV-radiation, which discharge lamps emit very efficient UV-radiation having a wavelength of 254 nm and 185 nm.

However, mercury discharge lamps have certain drawbacks when they are used for the discontinuous treatment of small water quantities, for example at a tap. For example, when water is to be drawn, said discharge lamps are not directly operational. As they require a starter, their ignition is delayed by a few seconds. In addition, they do not reach their maximum capacity until after they have reached their operation temperature. Due to the low temperatures of tap water, the time necessary to reach the operating temperature is additionally increased. What is needed in fact is high-intensity UV-radiation which is directly available to avoid wasting water and energy.

The use of high-power radiators for ultraviolet light to disinfect water is disclosed already in EP 0 312 732, which high-power radiators comprise a discharge space filled with a filler gas, the walls of said discharge space being formed by a first and a second dielectric material, which is provided with first and second electrodes on the surface facing away from the discharge space, which high-power radiator also comprises an alternating current source which is connected to the first and the second electrodes and which serves to supply power to the discharge, both the dielectric materials and the first and second electrodes being transparent to said radiation. To change the spectral composition of the radiation, the composition of the filler gas is changed.

SUMMARY OF THE INVENTION

It is an object of the invention to provide a device for disinfecting water, which device comprises a gas discharge lamp including a discharge vessel with walls composed of a dielectric material, which are provided, at their outer surface, with at least a first and a second electrode, and which discharge vessel contains a gas filling containing xenon, the radiation of said gas discharge lamp having a spectral composition. which is optimally suited for disinfecting water.

In accordance with the invention, this object is achieved by a device for disinfecting water, comprising a gas discharge lamp including a discharge vessel with walls composed of a dielectric material, the outer surface of said walls being provided with at least a first and a second electrode, and the discharge vessel containing a xenon-containing gas filling, said walls being provided, at least on a part of the inner surface, with a coating containing a phosphor emitting in the UV-C range.

Such a water-disinfecting device is always 100% operational within milliseconds, and the spectral composition of its UV-radiation lies exclusively in the relevant range for disinfecting, i.e. between 230 and 300 nm. As a result, unnecessary heating of water or generating visible light is avoided. Since radiation of a wavelength below 230 nm is not generated, the formation of harmful nitrite is avoided. Such a device may have a service life of 20,000 operating hours.

Within the scope of the invention it is preferred that the phosphor comprises an activator selected from the group formed by $Pb^{2+}$, $Bi^{3+}$ and $Pr^{3+}$ in a host lattice.

It may be preferred that the phosphor contains $Pr^{3+}$ and lanthanum. These phosphors emit UV-C radiation in two bands in the 220 nm and 265 nm ranges. In these ranges, the maximum disinfecting effect of UV-radiation is obtained in accordance with DIN 503-10.UV-C radiation of these wavelengths is absorbed by the DNA-nucleotides of the micro-organisms, where it brings about a photodimerization and hence the destruction of the micro-organisms.

It may be preferred, that the phosphor contains $Pr^{3+}$ and Ytrium. It is particularly preferred that the phosphor is selected from the group of $LaPO_4$:Pr, $LaBO_3$:Pr, $LaB_3O_6$:Pr, $YBO_3$:Pr and $Y_2SiO_5$. It can also be preferred that the phosphor is selected from the group of $YPO_4$ and $LuPO_4$:Bi.

The electrodes may be composed of a metal or an alloy reflecting UV-C light.

The invention also relates to a gas discharge lamp comprising a discharge vessel with walls composed of a dielectric material, the outer surfaces of said walls being provided with at least a first and a second electrode, and the discharge vessel being filled with a gas containing xenon, said walls being provided, at least on a part of their inner surface, with a coating containing a phosphor emitting in the UV-C range.

These and other aspects of the invention will be apparent from and elucidated with reference to the embodiments described hereinafter.

DESCRIPTION OF THE PREFERRED EMBODIMENTS

A lamp in accordance with the invention comprises a discharge vessel with a gas filling containing xenon, the walls of said discharge vessel being provided with at least a first and a second electrode, and at least partly with a coating containing a phosphor.

For the discharge vessel, a plurality or. designs are possible, such as plates, simple tubes, coaxial tubes, straight discharge tubes, U-shaped discharge tubes, circularly bent or coiled discharge tub(es, cylindrical discharge tubes, or discharge tubes of yet another shape.

Figure 1:
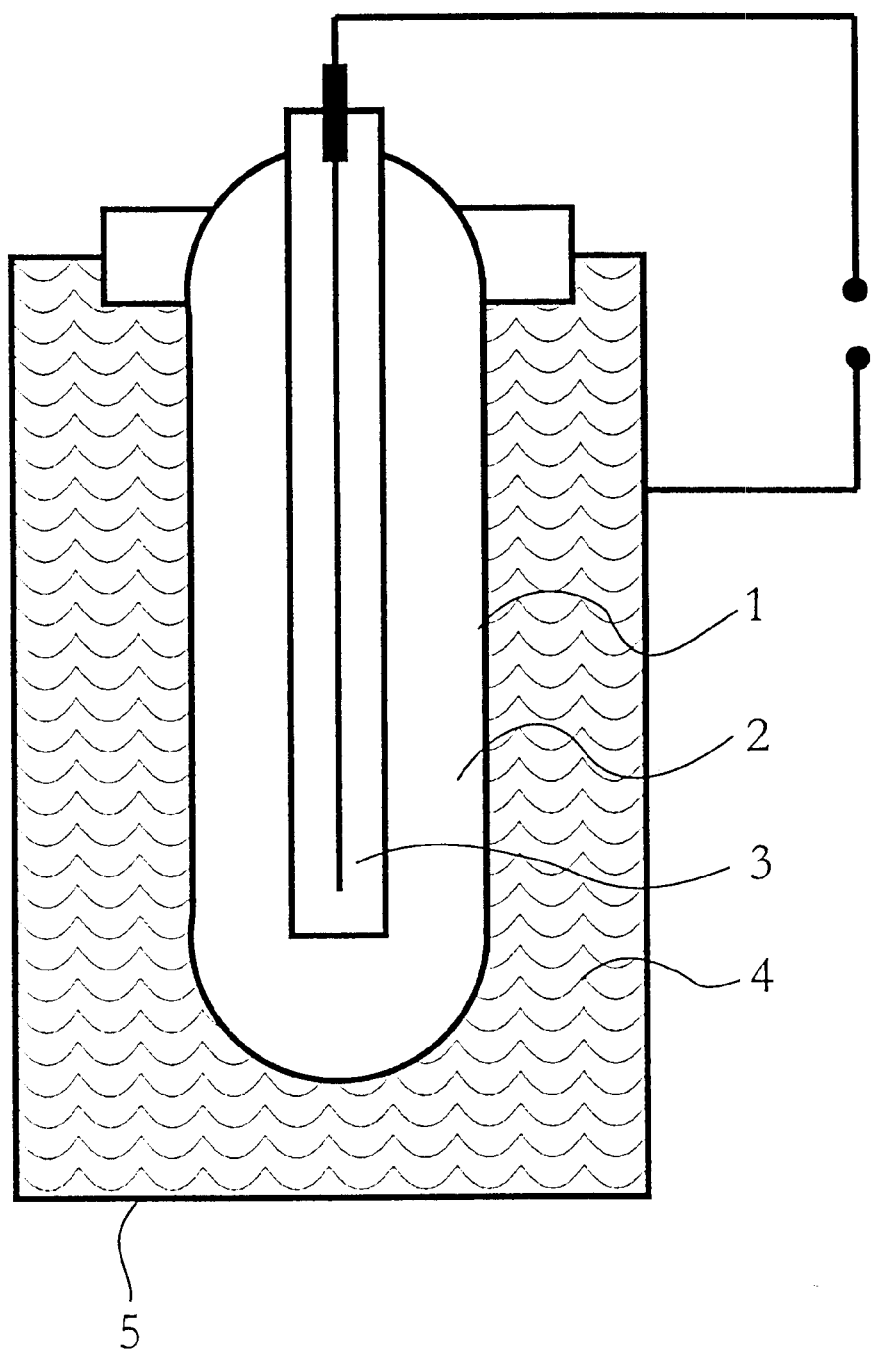
FIG. 1 shows a first embodiment of a cylindrical gas discharge lamp.
Figure 2:
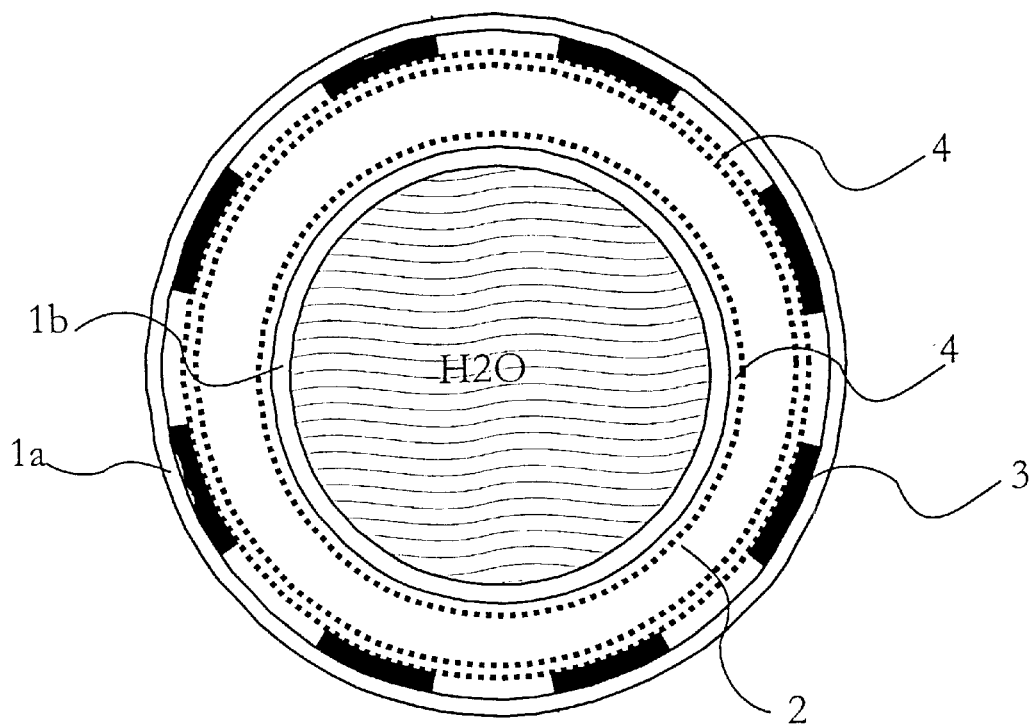
FIG. 2 shows a first embodiment of a coaxial gas discharge lamp in cross-section.
Figure 3:
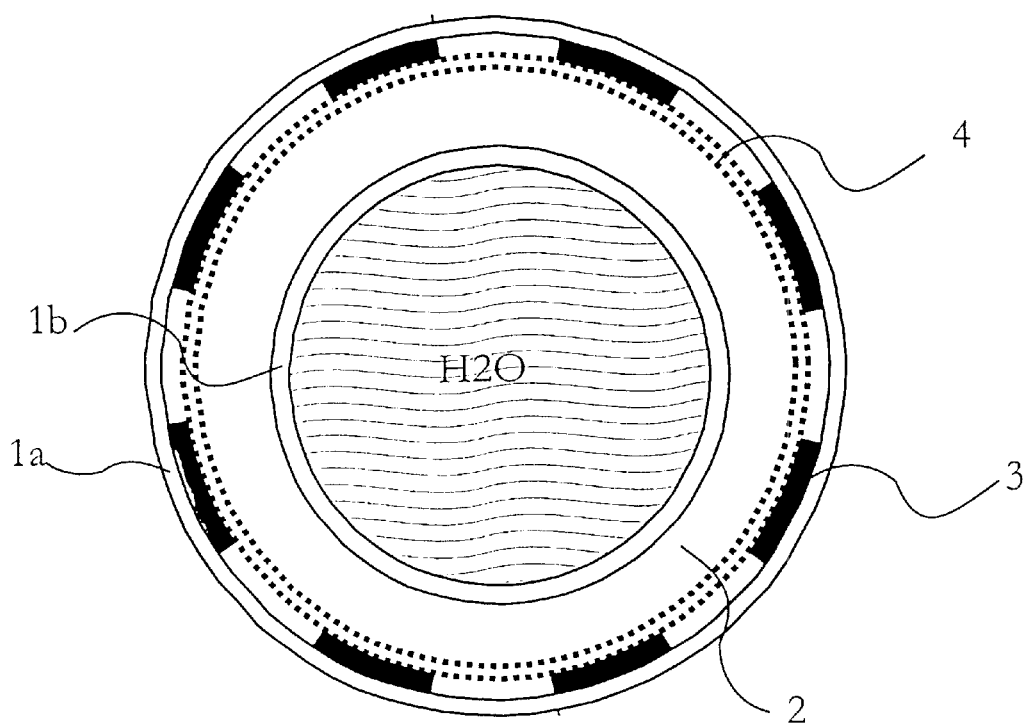
FIG. 3 shows a second embodiment of a coaxial gas discharge lamp in cross-section.
Figure 4:
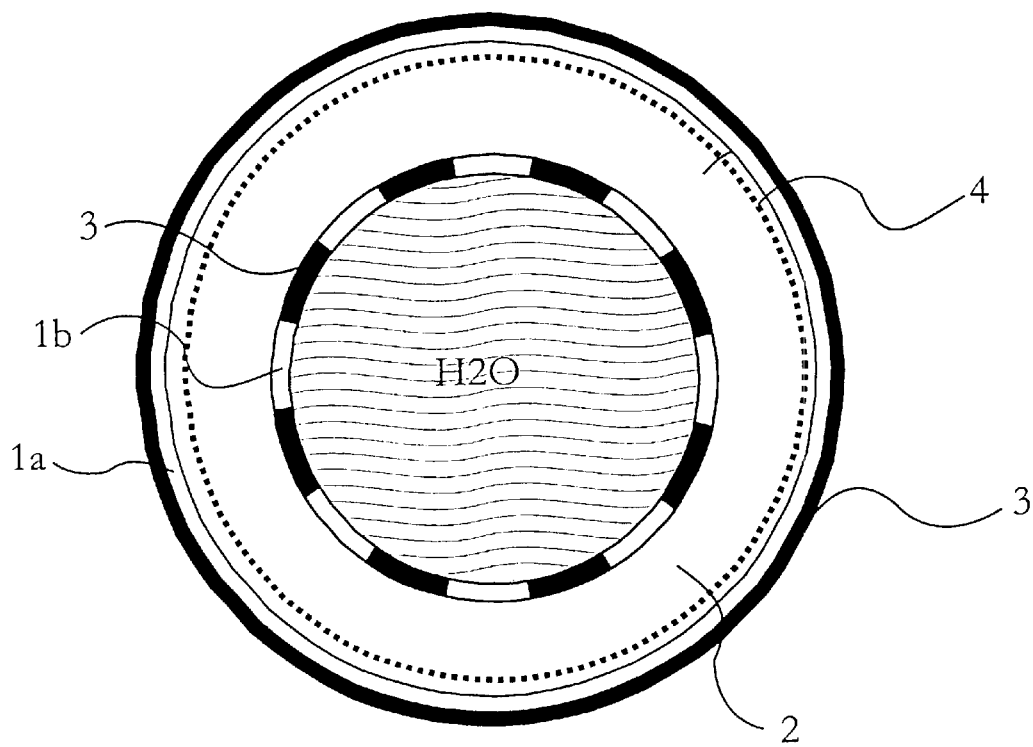
FIG. 4 shows a third embodiment of a coaxial gas discharge lamp in cross-section.
Figure 5:
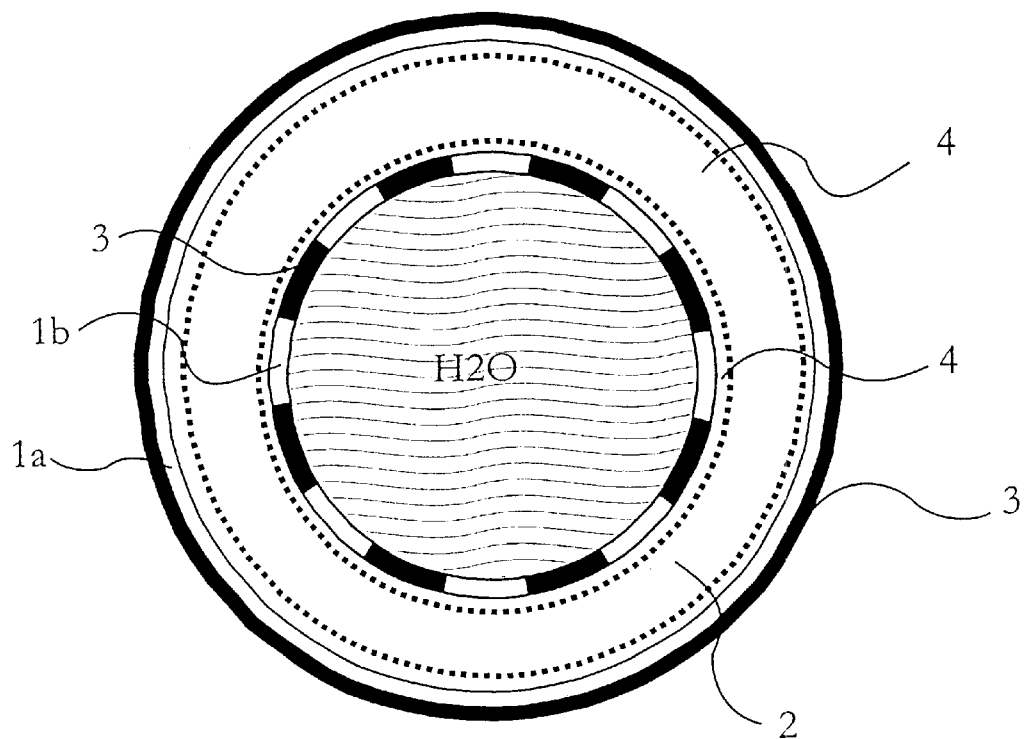
FIG. 5 shows a fourth embodiment of a coaxial gas discharge lamp in cross-section.

The dipping device shown in FIG. 1 represents a typical design of a lamp for a water-disinfecting device used as a domestic appliance. A glass tube 3 is concentrically arranged in the gas discharge vessel 1. A wire is inserted into the inner glass tube. This wire constitutes the first, inner electrode of the gas discharge lamp. The water 4 circulating around the lamp and the metal vessel wall 5 of the water-disinfecting device jointly constitute the seconds, outer electrode. The discharge vessel is sealed in a gastight manner. The inner space is filled with xenon or a xenon-containing gas. Both electrodes are connected with both poles of an alternating current source. The electrode geometry in combination with the pressure inside the discharge vessel and the gas composition are adjusted to the data of the alternating current source.

Another typical design of a water-disinfecting device used as a domestic appliance is the coaxial design having a central water flow as shown in FIGS. 2, 3, 4 and 5. The discharge vessel is composed of two coaxial glass bodies 1a, 1b, which are connected in a gastight manner to a hollow packing. The annular clearance between the two coaxial glass bodies constitutes the discharge space and is filled with xenon or a xenon-containing gas 2. The water to be disinfected flows through the inner tube, the inside wall of which is provided with a transparent electrode 3. The outer glass is covered with a wire gauze having a small mesh size, which wire gauze constitutes the outer electrode 3. For the power supply use is made of an alternating current source connected to both electrodes.

As the material for the discharge vessel use is made of quartz or glass types which are transparent to UV-C radiation.

The electrodes consist of a metal, for example aluminium or silver, a metal alloy or a transparent, conductive, inorganic compound, such as ITO. They may be embodied so as to be a coating, an adhered foil, a wire or a wire gauze.

To focus the light intensity in a specific direction, a part of the discharge vessel may be provided with a coating which acts as a reflector of VUV and UV-C light.

The discharge vessel is filled with oxygen-free xenon or a gas mixture containing xenon.

The inner wall of the discharge vessel is partly, or entirely, coated with a coating containing the phosphor. Said coating may additionally comprise an organic or inorganic binder or a binder composition.

The phosphor is composed of a host lattice doped with a few percent of an activator. Said host lattice always is an inorganic, oxygen-containing material, such as oxides, aluminates, phosphates sulfates, borates or silicates. The activator is a metal ion selected from the group formed by $Pr^{3+}$, $Bi^{3+}$ and $Pb^{2+}$. $CaSO_4$:Pb, $SrSO_4$:Pb, $MgSO_4$:Pb, $(Ca,Mg)SO_4$:Pb $(Ca,Mg,Sr)SO_4$:Pb, $(Ca,Sr)SO_4$:Pb, $CaLi_2SiO_4$:Pb, $SrSiO_3$:Pb, $(Ca,Sr,Ba)SiO_3$:Pb, $Ba(Y,Gd,Lu)$ $B_9O_{16}$:Bi, $YF_3Bi$, YOF:Bi, (Gd,Y)OF:Bi,Pr, $Y_3Al_5O_{12}$:Bi, $(Gd,Y)_3Al_5O_{12}$:Bi, $(Gd,Y)_3(Al,Ga)_5O_{12}$:Bi, $(Ca,Y,Lu)PO_4$:Pr, $(Lu,Y)BO_3$:Pr or $ScBO_3$:Pr can suitably be used as a phosphor. Particularly preferred phosphors are those comprising praseodymium, such as $LaPO_4$:Pr, $LaB_3O_6$:Pr, $LaBo_3$:Pr, $YBO_3$:Pr, $YPO_4$:Pr and $Y_2SiO_5$:Pr. Other preferred phosphors are phosphors comprising Bi, such as $YPO_4$:Bi and $LuPO_4$:Bi.

When an AC voltage is applied to the electrodes, a corona discharge may be ignited in the xenon-containing filling gas. As a result, excimers, i.e. molecules composed of an excited xenon-atom and a xenon-atom in the ground state, form in the xenon. $Xe+X^*=Xe_2^*$ The excitation energy is released again as UV-radiation having a wavelength of =180 to 190 nm. This conversion of electron energy into UV-radiation takes place very efficiently. The UV-photons generated are absorbed by the activator ions and the excitation energy is partly released again in the spectral range of longer wavelength. The absorption coefficient of the phosphors activated with $Pb^{2+}$, $Bi^{3+}$ or $Pr^{3+}$ is very large for the wavelengths in the xenon-radiation range, and the quantum yield is high. The host lattice does not take part in the luminescence process, however, it does influence the exact position of the energy levels of the activator ion and hence the absorption and emission wavelengths. The phosphors are prepared by a solid state reaction from the starting compounds in the form of fine-grain powders having a grain-size distribution between 1 and 10 $\mu$m. Said phosphors are applied to the walls of the discharge vessel by means of a flow-coating process. The coating suspensions for the flow-coating process contain water or an organic compound, such as butylacetate, as the solvent. By adding auxiliary agents, such as stabilizers, liquefiers, cellulose derivatives, he suspension is stabilized and the rheological properties thereof are influenced. The phosphor suspension is provided on the walls of the vessel in the form of a thin layer, and subsequently dried and baked at 600° C. Next, the vessel is evacuated to remove all gaseous impurities, in particular oxygen. Subsequently, the vessel is filled with xenon at a gas pressure off approximately 200–300 mbar and sealed.

Table 1 shows the relative disinfecting action of gas discharge lamps comprising lead-containing or praseodymium-containing phosphors and of a mercury gas discharge lamp in comparison with UV-radiation of wavelength $\lambda$=265 nm and a disinfecting action of 1.0, calculated in accordance with the spectrum of activity according to DIN 5031-10.

TABLE 1

| | Relative disinfecting action | |
|---|---|---|
| UV-Source | Emission Band/Line [nm] | Relative Disinfecting Action |
| Hg Plasma | 254 | 0.84 |
| $CaSO_4$:Pb | 230 | 0.73 |
| $(Ca,Mg)SO_4$:Pb | 246 | 0.75 |
| $SrSiO_3$:Pb | 273 | 0.75 |
| $LaPO_4$:Pr | 225,258 | 0.79 |

In a water-disinfecting device, the gas discharge lamp may also be combined with, for example, an active coal filter. A gas discharge lamp in accordance with the invention can be used as a radiation source to irradiate ink, coloring substances, photoresist lacquers, as well as for photochemical processes.

EXAMPLE 1 OF EMBODIMENT

A suspension of $SrSiO_3$ in butylacetate using nitrocellulose as the binder is prepared. By means of a flow-coating process, the phosphor suspension is applied to the inner surface of a quartz tube having a diameter of 5 mm. The thickness of the phosphor layer corresponds to a basis weight of the phosphor of 3 mg/cm². The binder is burned out at a temperature below 580° C. The lamp is filled with xenon at a gas pressure in the range from 200 to 300 mbar and subsequently sealed. Care should be taken to avoid oxygen impurities. Two electrodes of aluminium foil are diagonally adhered to the outer surface of the lamp.

The lamp is operated by means of a square-wave alternating current of 6 kV and 25 kHz.

Figure 6:
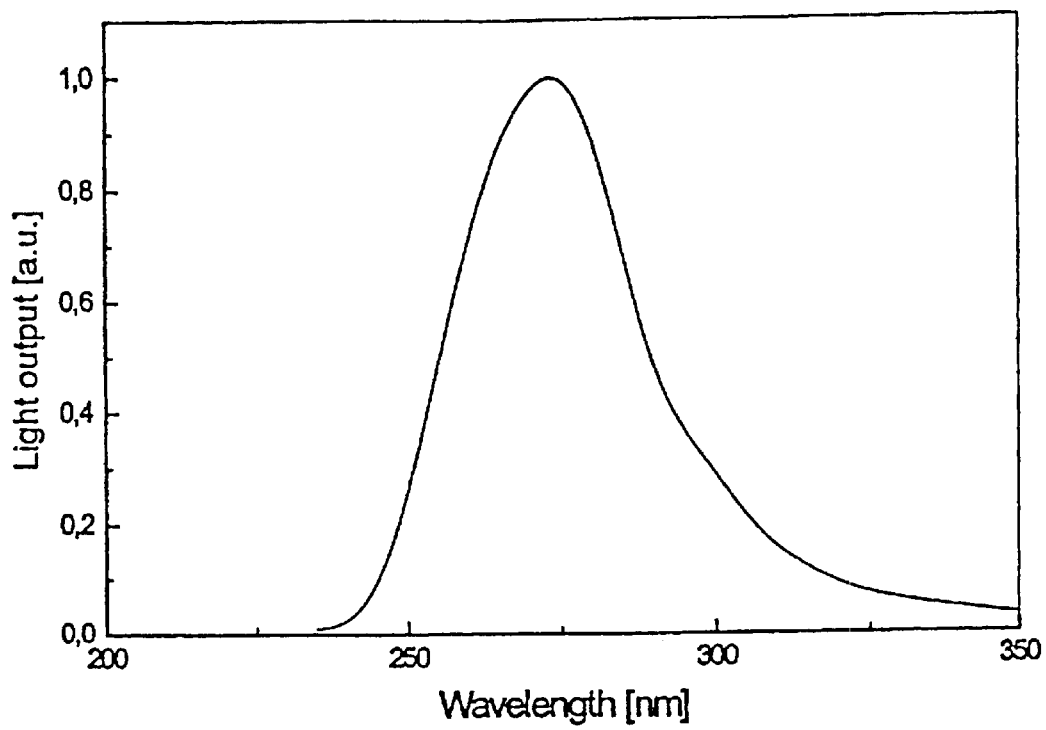
FIG. 6 shows the emission spectrum of a gas discharge lamp comprising $SrSiO_3$:Pb as the phosphor.

The emission spectrum shown in FIG. 6 was analyzed by means of a multi-analyzer for optical spectra.

EXAMPLE 2 OF EMBODIMENT

The discharge vessel of the lamp in accordance with example 2 comprises a cylindrical tube of Suprasil™ having a thickness of 0.7 mm and a diameter of 50 mm. Said discharge vessel is filled with xenon at a pressure of 200 mbar. The wire-shaped inner electrode is arranged at the location of the tube axis. For the outer electrodes use is made of six strips of silver foil which are adhered to the outer surface of the discharge vessel so as to extend parallel to the inner electrode. The inner surface of the outer wall is coated with a $CaSO_4$:Pb-containing phosphor layer.

The lamp is operated by means of a square-wave alternating current of 6 kV and 25 kHz.

Figure 7:
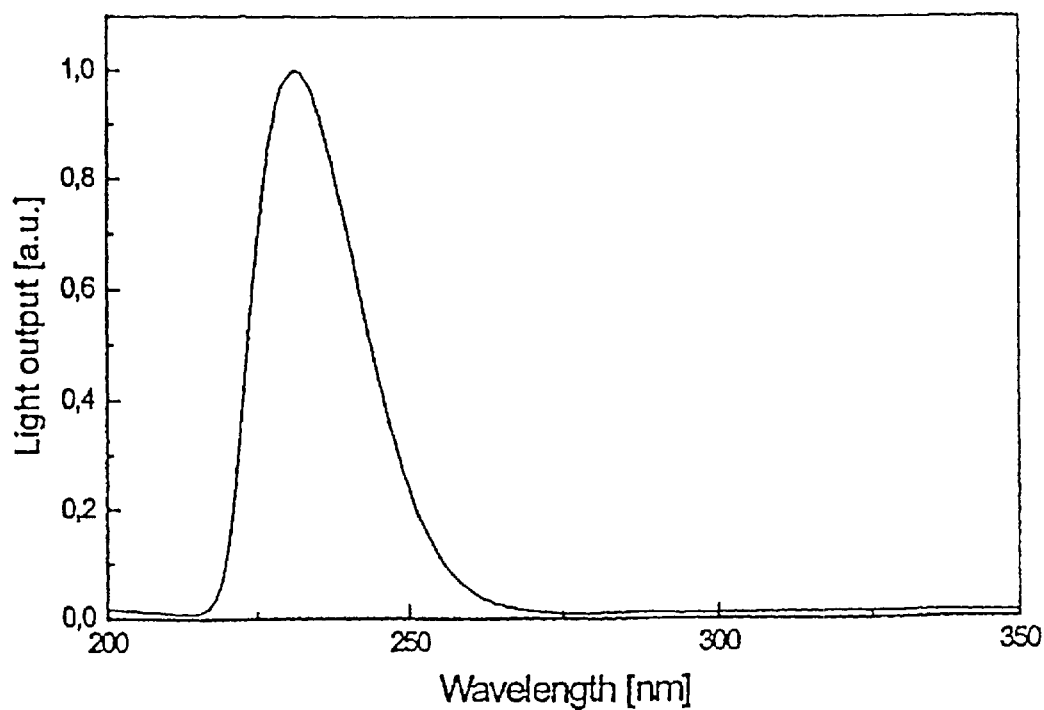
FIG. 7 shows the emission spectrum of a gas discharge lamp comprising $CaSO_4$:Pb as the phosphor.

The emission spectrum of FIG. 7 was analyzed by means of a multi-analyzer for optical spectra.

EXAMPLE 3 OF EMBODIMENT

The discharge vessel of the lamp in accordance with example 3 is composed of two coaxial tubes of Suprasil™ having a thickness of 0.7 mm and a diameter of 50 mm, said coaxial tubes being interconnected at their ends in a gastight manner. The discharge vessel is filled with xenon at a pressure of 200 mbar. Six strips of silver foil are adhered to the outer surface of the discharge vessel so as to extend parallel to the tube axis. These strips of silver foil are paired so as to form the first and second electrodes. The inner surface of the outer glass tube is coated with a (Ca,Mg)$SO_4$:Pb-containing phosphor layer.

Figure 8:
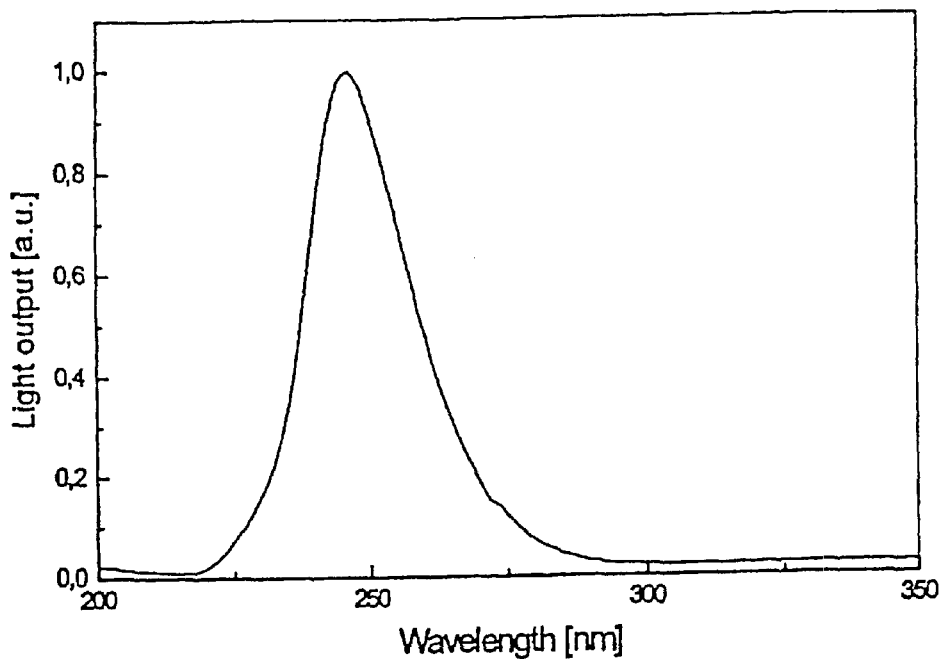
FIG. 8 shows the emission spectrum of a gas discharge lamp comprising $(Ca,Mg)SO_4$:Pb as the phosphor.

The lamp is operated by means of a square-wave alternating current of 6 kV and 25 kHz. The emission spectrum of FIG. 8 was analyzed by means of a multi-analyzer for optical spectra.

EXAMPLE 4 OF EMBODIMENT

The discharge vessel of the lamp in accordance with example 4 is composed of two coaxial tubes of Suprasil™ having a thickness of 0.7 mm and a diameter of 50 mm, said coaxial tubes being interconnected at their ends in a gastight manner. The discharge vessel is filled with xenon at a pressure of 200 mbar. Six strips of silver foil are adhered to the outer surface of the discharge vessel so as to extend parallel to the tube axis. These strips of silver foil are paired so as to form the first and second electrodes. The inner surface of the inner glass tube is coated with a (Ca,Mg)$SO_4$:Pb-containing-phosphor layer.

Figure 9:
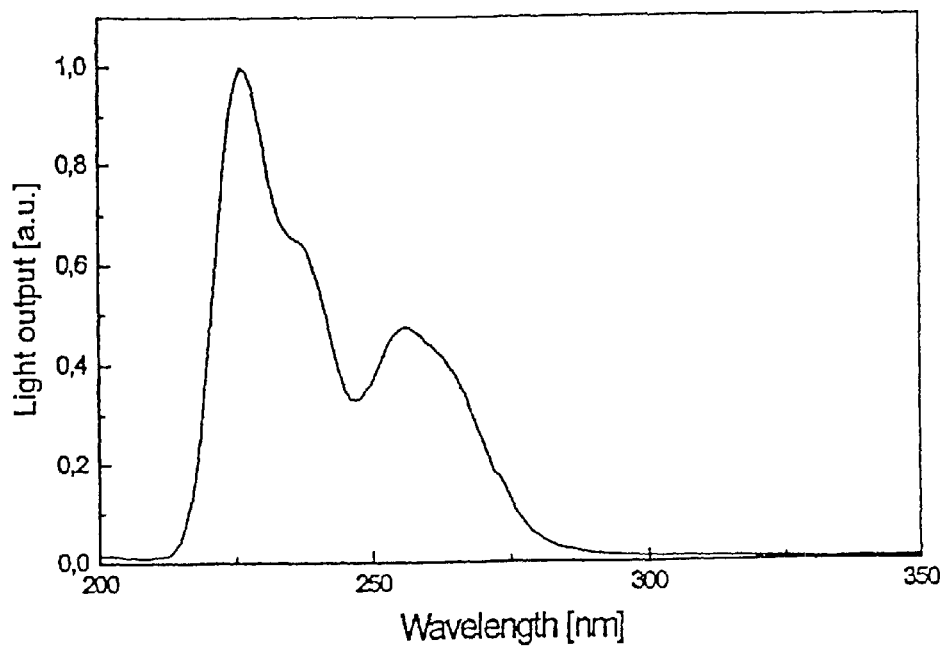
FIG. 9 shows the emission spectrum of a gas discharge lamp comprising $LaPO_4$:Pr as the phosphor.

The lamp is operated by means of a square-wave alternating current of 6 kV and 25 kHz. The emission spectrum of FIG. 9 was analyzed by means of a multi-analyzer for optical spectra.

What is claimed is:

1. A device for disinfecting water comprising a gas discharge lamp including a discharge vessel with walls composed of a dielectric material, comprising a first electrode on the outer surface of said walls and a second electrode, said discharge vessel containing a xenon-containing gas filling, wherein the walls are provided, at least on a part of the inner surface, with a coating containing a phosphor emitting in the UV-C range.

2. A device for disinfecting water as claimed in claim 1, wherein the phosphor comprises an activator selected from the group consisting of $Pb^{2+}$, $Bi^{3+}$ and $Pr^{3+}$ in a host lattice.

3. A device for disinfecting water as claimed in claim 1, wherein the phosphor contains $Pr^{3+}$ and lanthanum.

4. A device for disinfecting water as claimed in claim 1, wherein the phosphor is selected from the group consisting of $LaPO_4$:Pr, $LaBO_3$:Pr, $YBO_3$:Pr , $YPO_4$:Pr and $Y_2SiO_5$: Pr.

5. A device for disinfecting water as claimed in claim 1, wherein the phosphor is selected from the group consisting of $YPO_4$:Bi: and $LaPO_4$:Bi.

6. A device for disinfecting water as claimed in claim 1, wherein the phosphor contains $Pr^{3+}$ and yttrium.

7. A device for disinfecting water as claimed in claim 1, wherein the electrodes are composed of a metal or an alloy reflecting UV-C light.

8. A gas discharge lamp comprising a discharge vessel with walls composed of a dielectric material, the outer surface of said walls being provided with at least a first and a second electrode, and the discharge vessel being filled with a gas containing xenon, wherein the walls are provided, at least on a part of their inner surface, with a coating containing a phosphor emitting in the UV-C range.

* * * * *